(12) United States Patent
Karthikeyan et al.

(10) Patent No.: US 10,728,157 B2
(45) Date of Patent: Jul. 28, 2020

(54) LOCAL AND DEMAND DRIVEN QOS MODELS

(71) Applicant: BRITISH TELECOMMUNICATIONS PUBLIC LIMITED COMPANY, London (GB)

(72) Inventors: Vidhyalakshmi Karthikeyan, London (GB); Detlef Nauck, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 233 days.

(21) Appl. No.: 15/740,852

(22) PCT Filed: Jun. 30, 2016

(86) PCT No.: PCT/EP2016/065417
§ 371 (c)(1),
(2) Date: Dec. 29, 2017

(87) PCT Pub. No.: WO2017/001618
PCT Pub. Date: Jan. 5, 2017

(65) Prior Publication Data
US 2018/0191620 A1    Jul. 5, 2018

(30) Foreign Application Priority Data

Jun. 30, 2015 (EP) .................................... 15275166
Sep. 28, 2015 (EP) .................................... 15187163
(Continued)

(51) Int. Cl.
*H04L 12/851* (2013.01)
*H04L 12/725* (2013.01)
*H04L 12/927* (2013.01)

(52) U.S. Cl.
CPC ............ *H04L 47/24* (2013.01); *H04L 45/302* (2013.01); *H04L 47/805* (2013.01)

(58) Field of Classification Search
None
See application file for complete search history.

(56) References Cited

U.S. PATENT DOCUMENTS

| 6,631,135 B1 | 10/2003 | Wojcik |
| 6,690,929 B1 | 2/2004 | Yeh |
| (Continued) | | |

FOREIGN PATENT DOCUMENTS

| EP | 1 016 261 | 7/2000 |
| EP | 1 374 486 | 1/2004 |
| (Continued) | | |

OTHER PUBLICATIONS

U.S. Appl. No. 15/740,832, filed Dec. 29, 2017 (29 pages).
(Continued)

*Primary Examiner* — Jason E Mattis
*Assistant Examiner* — Hong Shao
(74) *Attorney, Agent, or Firm* — Nixon & Vanderhye P.C.

(57) ABSTRACT

The present invention provides a method comprising: receiving a plurality of queries, each query specifying one or more quality-of-service (QoS) requirements for the transmission of a data flow in a network; determining a query prototype, the query prototype comprising at least one QoS component value based on the one or more QoS requirements; obtaining a plurality of items of route data, wherein each item of route data is associated with a corresponding route through the network and indicates a QoS component of the corresponding route; comparing the route data with the query prototype to identify routes which match the query prototype; and in the event that a selected number of routes match the query prototype, responding to a further query by
(Continued)

transmitting a query response comprising a new QoS model based on the matching query prototype.

16 Claims, 7 Drawing Sheets

(30) Foreign Application Priority Data

Sep. 30, 2015 (EP) .................................. 15187813
Mar. 24, 2016 (EP) .................................. 16162447

(56) References Cited

U.S. PATENT DOCUMENTS

| | | | |
|---|---|---|---|
| 7,668,946 | B1 | 2/2010 | Garcia-Franco et al. |
| 7,715,312 | B2 | 5/2010 | Khasnabish et al. |
| 8,073,455 | B1 | 12/2011 | Xie et al. |
| 8,797,867 | B1 | 8/2014 | Chen et al. |
| 2001/0013067 | A1 | 8/2001 | Koyanagi et al. |
| 2002/0174227 | A1 | 11/2002 | Hartsell |
| 2003/0112762 | A1 | 6/2003 | Mahmoud et al. |
| 2003/0202536 | A1* | 10/2003 | Foster ............... H04L 49/357 370/469 |
| 2004/0120705 | A1 | 6/2004 | Friskney et al. |
| 2005/0083762 | A1 | 4/2005 | Rui et al. |
| 2005/0102414 | A1 | 5/2005 | Hares et al. |
| 2006/0029096 | A1* | 2/2006 | Babbar ............... H04W 28/24 370/466 |
| 2006/0187817 | A1 | 8/2006 | Charzinski et al. |
| 2006/0209891 | A1* | 9/2006 | Yamada ............... H04L 45/00 370/468 |
| 2007/0230363 | A1 | 10/2007 | Buskens et al. |
| 2007/0268827 | A1 | 11/2007 | Csaszar |
| 2008/0008091 | A1 | 1/2008 | Yumoto |
| 2008/0065318 | A1 | 3/2008 | Ho |
| 2008/0232247 | A1 | 9/2008 | Evans |
| 2009/0245130 | A1 | 10/2009 | Bing |
| 2010/0027517 | A1* | 2/2010 | Bonta ............... H04L 45/22 370/338 |
| 2010/0100525 | A1 | 4/2010 | Huang |
| 2010/0214920 | A1 | 8/2010 | Tewani et al. |
| 2010/0265826 | A1 | 10/2010 | Khasnabish |
| 2011/0087522 | A1 | 4/2011 | Beaty et al. |
| 2012/0057461 | A1 | 3/2012 | Bader |
| 2013/0144550 | A1 | 6/2013 | Czompo |
| 2013/0275567 | A1 | 10/2013 | Karthikeyan et al. |
| 2013/0275589 | A1 | 10/2013 | Karthikeyan et al. |
| 2013/0311673 | A1 | 11/2013 | Karthikeyan |
| 2014/0046880 | A1 | 2/2014 | Breckenridge |
| 2014/0052850 | A1 | 2/2014 | Doorhy et al. |
| 2015/0074283 | A1 | 3/2015 | Karthikeyan et al. |
| 2015/0098338 | A1 | 4/2015 | Bhattacharya |
| 2015/0332155 | A1 | 11/2015 | Mermoud |
| 2015/0381648 | A1 | 12/2015 | Mathis |
| 2016/0171398 | A1 | 6/2016 | Eder |
| 2016/0344604 | A1 | 11/2016 | Raleigh |
| 2018/0191606 | A1 | 7/2018 | Karthikeyan et al. |
| 2018/0191621 | A1 | 7/2018 | Karthikeyan et al. |
| 2018/0191635 | A1 | 7/2018 | Karthikeyan et al. |

FOREIGN PATENT DOCUMENTS

| | | |
|---|---|---|
| EP | 1 401 161 | 3/2004 |
| EP | 1 453 256 | 8/2005 |
| EP | 1 248 431 | 10/2007 |
| EP | 1 993 231 | 11/2008 |
| EP | 2 151 951 | 2/2010 |
| EP | 2 261 811 | 12/2010 |
| EP | 2 469 756 | 6/2012 |
| EP | 1 875 693 | 8/2012 |
| GB | 2 523 568 | 9/2015 |
| WO | 99/14931 | 3/1999 |
| WO | 02/080458 A1 | 10/2002 |
| WO | 2006/116308 | 11/2006 |
| WO | 2011/076282 | 6/2011 |
| WO | 2012/085520 | 6/2012 |
| WO | 2012/085521 | 6/2012 |
| WO | 2013/144550 | 10/2013 |
| WO | WO 2013/0185175 | 12/2013 |
| WO | 2014/068268 | 5/2014 |
| WO | 2014/068270 | 5/2014 |
| WO | 2017/001628 | 1/2017 |
| WO | 2017/001629 | 1/2017 |

OTHER PUBLICATIONS

International Search Report and Written Opinion issued in PCT/EP2016/065434 dated Oct. 6, 2016 (15 pages).
Valikannu "A Novel Energy Consumption Model using Residual Energy Based Mobile Agent Selection Scheme (REMA) in MANETs", 2015 $2^{nd}$ International Conference on Signal Processing and Integrated Networks (SPIN), Noida, India. Pub., IEEE, Feb. 19-20, 2015 (6 pages).
GB Search Report issued in GB1517349.5, dated May 26, 2016 (6 pages).
Search Report dated Apr. 28, 2016 issued in GB1517110.1 (7 pages).
International Search Report and Written Opinion of the International Searching Authority dated Sep. 23, 2016, issued in International Application No. PCT/EP2016/065431 (15 pages).
U.S. Appl. No. 15/740,837, filed Dec. 29, 2017 (33 pages).
Extended European Search Report dated Nov. 26, 2015 issued in European Application No. 15275166.5 (5 pages).
International Search Report and Written Opinion of the International Searching Authority dated Sep. 5, 2016 issued in International Application No. PCT/EP2016/065429 (16 pages).
Tanja Zseby and Sebastian Zander, "Sampling Schemes for Validating Service Level Agreements", Centre for Advanced Internet Architectures, CAIA Technical Report 040706A, Jul. 2004 (6 pages).
Zhengdong Gao and Gengfeng Wu, "Combining QoS-based Service Selection with Performance Prediction", School of Computer Engineering and Science, Shanghai University, Proceedings of the 2005 IEEE International Conference on e-Business Engineering (ICEBE'05); 2005 (4 pages).
U.S. Appl. No. 15/740,520, filed Dec. 28, 2017 (29 pages).
Office Action dated Apr. 19, 2019 issued in U.S. Appl. No. 15/740,837 (14 pages).
Office Action dated Oct. 17, 2018 issued in U.S. Appl. No. 15/740,837 (11 pages).
Advisory Action dated Aug. 2, 2019 issued in U.S. Appl. No. 15/740,837 (4 pages).
Office Action dated Apr. 19, 2019 issued in U.S. Appl. No. 15/740,832 (12 pages).
Office Action dated Oct. 17, 2018 issued in U.S. Appl. No. 15/740,832 (11 pages).
Office Action dated Nov. 2, 2018 issued in U.S. Appl. No. 15/740,520 (13 pages).
Office Action dated May 30, 2019 issued in U.S. Appl. No. 15/740,520 (16 pages).
Examination Report issued in EP Application No. 16 733 597.5 dated Sep. 12, 2019 (9 pages).
Ananya DAS "Maximizing Profit Using SLA-Aware Provisioning", 2012 IEEE Network Operations and Management Symposium (NOMS), Math & Computer-Science Department, Lake Forest College, Apr. 16, 2012 (8 pages).
International Search Report and Written Opinion issued in PCT/EP2016/065417 dated Oct. 7, 2016 (15 pages).
GB Search Report issued in GB1605201.1, dated Nov. 1, 2016 (5 pages).
Blanquer, et al. "QUORUM: Flexible Quality of Service for Internet Services" USENIX, Department of Science, University of California, Santa Barbara, May 4, 2005, XP061012380 (16 pages).
E. Crawley, et al. Network Working Group, RFC 2386, "A Framework for QoS-based Routing in the Internet", Aug. 1998, XP002219363, (37 pages).

(56) References Cited

OTHER PUBLICATIONS

Balaraman, "Business Data Mining and Decision Making Application of Data Mining in the Telecommunication Industry" Term paper, Quantitative Methods & Information Systems, Indian Institute of Management Bangalore, Oct. 22, 2011 (23 pages).
Office Action dated Mar. 4, 2020 issued in U.S. Appl. No. 15/740,520 (19 pgs.).
Office Action dated Nov. 13, 2019 issued in U.S. Appl. No. 15/740,832 (12 pgs.).
Office Action dated Nov. 13, 2019 issued in U.S. Appl. No. 15/740,837 (11 pgs.).
Advisory Action dated Oct. 8, 2019, issued in U.S. Appl. No. 15/740,520 (3 pages).

* cited by examiner

Fig. 1

| Prototype Vector | Jitter | Loss | Delay |
|---|---|---|---|
| $p_1$ | 3.01 | 0.1506 | 24.82 |
| $p_2$ | 4.00 | 0.1003 | 29.76 |
| $p_3$ | 2.50 | 0.1995 | 19.90 |

Fig. 2A

| Confidence Vector | Jitter | Loss | Delay |
|---|---|---|---|
| $c_1$ | 0.0280 | 0.0015 | 0.2193 |
| $c_2$ | 0.0395 | 0.0008 | 0.2235 |
| $c_3$ | 0.0211 | 0.0017 | 0.1905 |

Fig. 2B

| | Base Data | | | | Global Statistics | | | |
|---|---|---|---|---|---|---|---|---|
| ID | Prototype | Global Confidence | Created | Capacity [Mb/s] | Routes | Peak Flows | Peak Demand [Mb/s] | 1hr Flows | ... |
| 1 | (3.1, 0.1521, 25.15) | (0.0280, 0.0015, 0.2193) | 20/03/2014 12:00 | 200 | 3 | 24 | 153 | 13 | ... |
| 2 | (4.00, 0.1003, 29.76) | (0.0395, 0.0008, 0.2235) | 20/03/2014 14:00 | 150 | 3 | 0 | 0 | 0 | ... |
| 3 | (2.50, 0.1995, 19.90) | (0.0211, 0.0017, 0.1905) | 20/03/2014 14:00 | 300 | 3 | 0 | 0 | 0 | ... |
| ... | ... | ... | ... | | ... | ... | ... | ... | ... |

Fig. 2C

| | Base Data | | | | Route-based Statistics | | |
|---|---|---|---|---|---|---|---|
| Route | Model ID | Route Confidence | Active since | Capacity [Mb/s] | Peak Flows | Peak Demand [Mb/s] | ... |
| 1 | 1 | (0.0280, 0.0015, 0.2193) | 20/03/2014 12:00 | 100 | 8 | 82 | |
| 2 | 1 | (0.0280, 0.0015, 0.2193) | 20/03/2014 12:00 | 50 | 9 | 48 | |
| 3 | 1 | (0.0280, 0.0015, 0.2193) | 20/03/2014 12:00 | 50 | 7 | 23 | |
| 4 | 2 | (0.0395, 0.0008, 0.2235) | 20/03/2014 14:00 | 200 | 0 | 0 | ... |
| ... | ... | ... | ... | | ... | ... | ... |
| 9 | 3 | (0.0211, 0.0017, 0.1905) | 20/03/2014 14:00 | 100 | 0 | 0 | ... |
| ... | ... | ... | ... | | ... | ... | ... |

Fig. 2D

| ID | Route | $t_s$ | $t_e$ | Throughput (Mbps) | Jitter (ms) | Loss (%) | Delay (ms) | Model |
|---|---|---|---|---|---|---|---|---|
| 1 | 1 | 13.00 | 13.20 | 9.88 | 3.053416 | 0.148704 | 24.72323 | 1 |
| 2 | 2 | 13.05 | 13.15 | 10.18 | 3.030675 | 0.150843 | 25.04373 | 1 |
| 3 | 3 | 13.00 | 13.20 | 9.81 | 2.955859 | 0.15138 | 24.61943 | 1 |
| 4 | 1 | 13.20 | 13.38 | 9.84 | 2.989925 | 0.151806 | 24.64379 | 1 |
| … | … | … | … | … | … | … | … | … |

Fig. 3A

| Request ID | Jitter | Loss | Delay | Resilience | Energy | Load distribution | Source | Destination |
|---|---|---|---|---|---|---|---|---|
| 1 | J1 | L1 | D1 | ✓ | ✓ | ✗ | C1 | C2 |
| 2 | ✗ | L2 – L3 | ✗ | ✗ | ✗ | ✓ | C3 | C4 |
| 3 | ✓ | ✓ | D2 – D3 | ✓ | ✗ | ✗ | C1 | C4 |

LOCAL AND DEMAND DRIVEN QOS MODELS

This application is the U.S. national phase of International Application No. PCT/EP2016/065417 filed Jun. 30, 2016, which designated the U.S. and claims priority to EP Patent Application 15275166.5 filed Jun. 30, 2015, EP Patent Application 15187163.9 filed Sep. 28, 2015, EP Patent Application 15187813.9 filed Sep. 30, 2015, and EP Patent Application 16162447.3 filed Mar. 24, 2016, the entire contents of each of which are hereby incorporated by reference.

TECHNICAL FIELD

The present disclosure relates to network communications, and in particular to routing in packet switched networks, and still more particularly to the routing of packets and the provision of Quality of Service, QoS, for packets transmitted over a computer network.

BACKGROUND

As the volume of traffic transmitted on packet switched networks has increased, and the types of traffic transmitted over such networks has broadened to include traffic types that rely upon low latency transmission over the network, such as voice or streaming media, it has become increasingly important to enable proactive management of the traffic on the network.

Quality of service models enable differentiated handling of different types of network traffic. The integrated services, Intserv, architecture is designed to guarantee a particular quality of service for the transmission of a stream of packets across a network. Prior to transmission of a stream of packets, Intserv requires that an originating network component reserves resources in each router through which the stream of packets will pass. This resource reservation, usually requested using RSVP (Resource Reservation Protocol), ensures that each router in the path has the necessary resources to guarantee transmission of the packet stream at a particular QoS prior to transmission of the packet stream. However, the IntServ system does not scale easily, since it quickly becomes difficult for the network components to manage the reservations.

An alternative approach is the differentiated services, Diffserv, computer networking architecture enables the network to classify the traffic into one of a specified and predetermined number of traffic classes. A differentiated services, DS, field is populated in each packet transmitted across the network and the field indicates to the network the quality of service, QoS, that is to be provided to that packet in its transmission between network components. The DiffServ model can be used to provide low-latency transmission of critical network traffic, such as streaming packets or voice-over-IP packets, across a network. Packets not marked with a prioritised packet code, such as email and web traffic, can be transmitted when the network components have capacity to do so.

SUMMARY

The present disclosure relates to methods and apparatus for selecting the quality of service models which are to be offered for use in a network. In particular, the disclosure relates to the formation of QoS models based on demand profiles, for example based on requests for class of service received from clients. The disclosure also relates to the formation of local QoS models, which offer QoS between selected source and destination addresses (for example between particular nodes of a network or between particular subnets).

In an aspect there is provided a method which may be used for selecting QoS models based on client demand. This method comprises: receiving a plurality of queries, each query specifying one or more quality-of-service (QoS) requirements for the transmission of a data flow in a network; determining a query prototype, the query prototype comprising at least one QoS component value based on the one or more QoS requirements; obtaining a plurality of items of route data, wherein each item of route data is associated with a corresponding route through the network and indicates a QoS component of the corresponding route; comparing the route data with the query prototype to identify routes which match the query prototype; and, in the event that a selected number of routes match the query prototype, responding to a further query by transmitting a query response comprising a new QoS model based on the matching query prototype.

The plurality of queries may comprise a source address for the traffic flow, and a destination address for the traffic flow. Analysis of the source and destination address information obtained from query messages may enable local QoS models to be determined for the network. Accordingly, the method may comprise determining the query prototype by selecting, from the plurality of queries, queries which match at least one of a source address criterion and a destination address criterion. For example, queries may be selected which relate to a particular source-destination pair. Once these queries have been identified, they can be clustered to determine the query prototype (or prototypes) to be offered to clients along the routes between those source and destination addresses. This same approach may be used to offer QoS models along routes which begin in any of a group of source addresses. Likewise, QoS models may be offered along routes whose destination is any of a group of source addresses. Such groups may comprise lists of individual addresses, or may be associated with particular clients, or with particular geographic areas. For example a source address criterion may be applied which comprises checking that the source address matches a particular source subnet mask. Likewise, the destination address criterion may comprise checking that the destination address of the traffic flow matches a destination subnet mask.

Whether done locally or globally, clusters of class of service requirements may be extracted from requests for class of service so as to identify query prototypes. These may be established by selecting client queries which specify values for the same QoS components, and then clustering the values of those components to determine the query prototype. Such a prototype may be provided by identifying a cluster centre for each QoS component specified by the selected client queries. These clusters may be identified using any clustering algorithm, such as K-means. Accordingly, the clusters may be selected to (a) reduce a sum of differences between the clusters and the plurality of queries; (b) reduce the total number of clusters; and (c) increase the difference between the selected clusters.

The method may also comprise determining whether to offer the new QoS model in a query response message based on comparing the query prototype with at least one pre-existing QoS model. This may avoid offering models which are already close to existing models, thereby reducing unwanted proliferation of QoS models.

Another aspect provides a method which may be used for selecting QoS models to be offered on routes between particular addresses (or groups of addresses) in a network. This method comprises receiving a plurality of queries, each query specifying: one or more quality-of-service (QoS) requirements for the transmission of a data flow in a network, a source address for the traffic flow, and a destination address for the traffic flow. The method comprises selecting, from the plurality of queries, queries which match a source address criterion and a destination address criterion. As noted above the source address criterion may specify a single address, or a group of addresses. In addition, the destination address criterion may also specify a single address, or a group of addresses. This may enable queries which relate to particular source-destination pairs to be identified. Once they have been identified, these queries can be used to determine a query prototype comprising at least one QoS component value. This QoS component value is based on the QoS requirements of the selected queries, and may be identified by clustering each of the QoS components specified by those queries. The query prototype can then be used to provide a a new QoS model for the transport of data flows between the relevant source(s) and destination(s). Accordingly, when further query messages are received, a query response can be sent which includes the new QoS model.

The method may comprise comparing route data with the query prototype to identify routes which match the query prototype. It can then be determined whether to offer the new QoS model based on characteristics of the routes which match the query prototype. For example, the new QoS model may only be offered in the event that at least a minimum number of routes match the query prototype. This may provide a minimum support requirement for the offering of any new model.

The method may also comprise determining whether to offer the new QoS model based on a confidence interval determined from the items of route data which match the query prototype.

Embodiments of the disclosure provide network devices configured to perform any one or more of the methods described herein. Examples of such network devices include a Gatekeeper, an edge router, and any network device capable of processing and routing packets. Such a device may comprise a communication interface for sending and receiving messages, some data storage for storing routing information, QoS models and QoS related data and a processor configured to perform any one or more of the methods described herein.

For example, in an aspect there is provided a network device comprising a processor coupled to control a communications interface for sending and receiving network packets and/or for sending control signals such as resource allocation messages to other network devices. The processor is configured to perform any one or more the methods described herein.

Embodiments of the disclosure also provide tangible non transitory computer readable media storing computer readable instructions configured to program a processor of a network device to perform any one or more of the methods described herein. Embodiments of the disclosure also provide computer program products comprising program instructions configured to program a processor of a network device to perform any method described herein.

BRIEF DESCRIPTION OF DRAWINGS

In the drawings, like reference numerals are used to indicate like elements.

SPECIFIC DESCRIPTION

Figure 1:
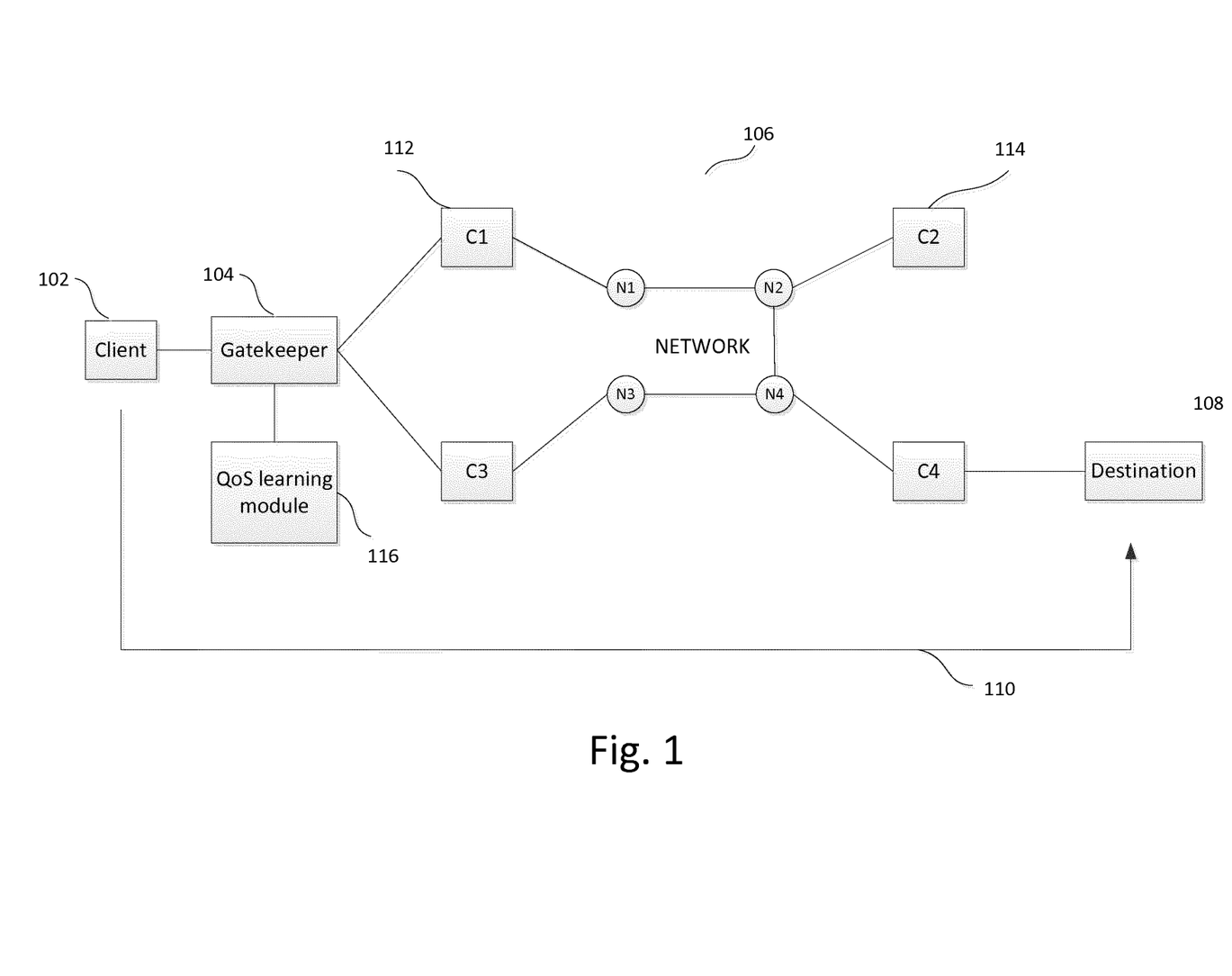
FIG. 1 illustrates a system for transmission of data flows across a network based on negotiated quality of service (QoS) metrics.

FIG. 1 illustrates a network 106 and an apparatus comprising a Gatekeeper 104, and a QoS Learning Module 116. A client 102, e.g. an entity wishing to send a flow of data, is coupled to a destination 108 by the apparatus 104, 116, and the network 106. The network is configured to provide data transmission in accordance with various distinct Quality of Service (QoS) models. Each QoS model in effect defines a Class of Service (CoS) that may be applied to traffic transported on the network. QoS models define bounds on various QoS metrics, such as packet loss. For example, one QoS model may define a particular maximum value for packet loss whilst another may specify a maximum packet delay. A single model may also combine multiple QoS metrics, such as packet loss, packet delay and jitter. Some QoS models may be predefined. For example, the network may provide a standard set of DiffServ classes of service such as Default PHB (typically best-effort traffic), Expedited Forwarding (EF) PHB (low-loss, low-latency traffic) and Assured Forwarding (AF) PHB (where PHB denotes per-hop-behaviour). Not all QoS models however need to be predefined. Some QoS models may be demand driven.

Embodiments described with reference to FIG. 1 may enable the QoS models advertised to the client 102 by the Gatekeeper 104 to be selected based on QoS queries received from clients. For example, QoS models having particular class of service components can be provided in response to client demand identified from received query messages. In addition, these models may be offered only in local regions of the network. For example, these QoS models may be offered on routes between particular pairs of source and destination addresses, or on routes between particular groups of source addresses and particular groups of destination addresses. For example, these QoS models may be offered on routes between a source address matching a source subnet mask, and a destination address matching a destination subnet mask. The QoS models may comprise a three-dimensional performance based model comprising jitter J, loss L and delay D. Accordingly, each such model $P_i$ can be characterised by a prototype vector $p_i=(j_i, l_i, d_i)$ and a confidence interval vector $c_i=(cj_i, cl_i, cd_i)$. The prototype vector $p_i$ specifies the typical or average performance and the confidence vector $c_i$ specifies a confidence interval p±c for each component p of $p_i$. An example of a confidence interval is a 99% confidence (e.g. 99% of the expected distribution will lie within ±c of the vector p, but other confidence intervals can be used). QoS Models need not be three-dimensional and may specify a greater or larger number of CoS performance metrics.

The Gatekeeper 104 is configured to provide an interface between the network and the client 102 (a user wishing to send traffic across the network). This interface may allow the client 102 to negotiate desired transport parameters for the traffic they wish to send. The negotiation process is explained in more detail below, but through this process, the Gatekeeper 104 thus provides "scoreboard" data to clients in the form of responses to query messages. This "scoreboard" data advertises the available QoS models and a corresponding CoS indicator (such as a Differentiated Services Code Point, DSCP, value) for each model. This CoS indicator can be used to identify the routes through the network which offer performance according to the corresponding QoS model. The Gatekeeper 104 may be provided at an edge router, a session admission unit, a bandwidth broker or at a network installed generic interface between a client 102 site and the network itself.

The QoS Learning Module 116 is configured to generate "demand driven" QoS models based on client queries (requests to transport traffic with particular QoS). This can be done by determining QoS requirements which feature in many client query messages requesting QoS. The QoS Learning Module 116 is configured to search data describing the routes through the network to identify those routes which offer QoS performance that matches these requirements. If a sufficient number of matching routes can be found, the QoS Learning Module 116 can provide a mapping between a new QoS model and the matching routes in the network so that the new QoS model can be offered at the Gatekeeper. The available QoS models advertised by the Gateway can thus be updated to include this new "demand driven" QoS model.

In a general mode of operation of the network illustrated in FIG. 1, each time a client wishes to transport a data flow through the network it sends a query message to the Gatekeeper 104. The query message specifies one or more QoS requirements—the QoS constraints that the client wishes to be applied to a traffic flow. The Gatekeeper 104 identifies QoS models matching the identified requirements, and provides information about the matching models in a response message to the client. If required, the query and response may be repeated one or more times, for example the client may revise its requirements based on the QoS models available to it. The client can then send a reservation message to the Gatekeeper 104. The reservation message identifies one or more of the available QoS models to select those models for the data flow. The Gatekeeper 104 then identifies and reserves (if possible) network resources for the data flow based on the selected QoS model(s). This may involve identifying suitable network routes and allocating bandwidth on those routes. The Gatekeeper 104 also allocates a distinct CoS identifier for the data flow and sends a response to the client indicating the allocated CoS identifier. The CoS identifier (e.g. in the form of a DSCP as discussed below) is subsequently used by the client to label traffic for the data flow. The Gatekeeper 104 or another network component (e.g. edge router) receiving data packets for the flow labelled with the CoS identifier, can then identify the agreed QoS metrics and/or allocated resources for the packets from the CoS identifier and route them through the network accordingly. It can thus be seen that the apparatus 104, 116 is arranged to receive a query message from a client requesting transport of a data flow through the network with a particular QoS. The apparatus can respond by sending a response message to the client advertising a set of available QoS models. The client 102 can then select from amongst those QoS models. The packets of the client's data flow 110 can then be labelled with an indicator of their selected QoS model (for example a CoS identifier which may be added to a packet using a differentiated services, DS, field of the packet). The network is configured so that those packets will then be transported through the network 106 according to that QoS model. This may be achieved by forwarding packets labelled with a particular indicator, such as a CoS identifier, along routes in the network that are associated with that indicator. The QoS models may be hard coded, or may be identified by a clustering analysis of QoS provided by the various different routes through the network.

In addition however the QoS models may be demand driven, that is to say QoS models may be selected based on query messages received from clients. Details of this process are explained in more detail below. At intervals (for example periodically) the QoS Learning Module may withdraw certain QoS models from being offered at the gateway, for example in the event that traffic transported according to that model becomes undesirable in some way, or if monitoring of the routes indicates that the routes associated with that model no longer comply with the model (no longer fall within a confidence interval of the model).

FIG. 1 shows a network comprising a number of edge nodes C1-C4 and internal nodes N1-N4. The edge nodes are coupled together via the network, for example via the internal nodes N1-N4. The edge nodes C1-C4 are also arranged to provide communications to and from the network. The network can thus provide various routes for carrying network traffic (e.g. data flows) between pairs of edge nodes C1-C4. These routes may comprise a sequence of network nodes. The routes may pass through one or more of the internal nodes N1-N4. For example, a first route from a first edge node C1 may pass through a first sequence of nodes to reach a second edge node C2 whilst a second route from that first edge node C1 may pass through a second sequence of nodes to reach the second edge node C2. The second sequence of nodes may be different from the first sequence of nodes. For example, the first route may be C1-N1-N2-C2, and the second route may be C1-N1-N2-N4-C4-C2 etc. As will be appreciated by the skilled person in the context of the present disclosure, more than two such routes may be available between any pair of edge nodes. Each of these routes may have different performance characteristics, for example in terms of packet loss or delay.

To obtain route data describing the performance of traffic routes through the network, the QoS Learning Module 116 (also referred to as a performance modeller, PM) may be configured to monitor those traffic routes. Such monitoring can identify the performance features of each route. The monitoring may be based on telemetry data which may be forwarded over the network. Based on such data the QoS Learning Module 116 can determine Class of Service parameters for each route such as jitter, packet loss and packet delay. This can provide route data, each item of route data defining performance characteristics of a particular route through the network. This can be done by observing QoS metrics for actual flows traversing the network along a particular route. For example, a given flow may be associated with a performance metric vector $p=<m\_1, m\_2, \ldots m\_n>$. Each metric corresponds to a different feature of the flow (e.g. packet delay, packet loss, jitter etc.). Such a flow may also be associated with a particular source address and a particular destination address. A corresponding item of route data can thus be defined which provides the source and destination of the route and a performance metric vector describing the QoS performance of that route through the network. Such data can be obtained dynamically as described above, but this is optional. It may also be obtained from stored data for example from a database of known routes, or it may be obtained from some external source which sends it to the QoS Learning Module 116. Any one or more of these approaches may be used to provide route data.

Figure 2A:
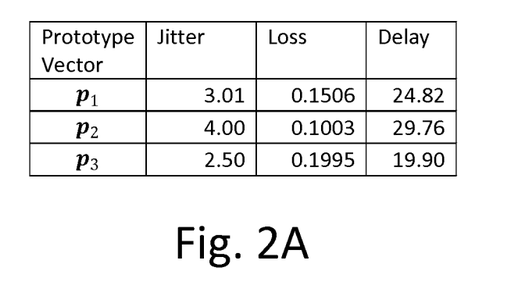
FIGS. 2A and 2B give examples of QoS feature vectors and confidence vectors that may be used to define QoS models.

FIG. 2A illustrates a set of query prototype vectors. In the examples illustrated in FIG. 2A each prototype vector includes metrics for the "jitter", "loss" and "delay" features. A query prototype may comprise data indicative of the spread of performance values across an identified cluster of queries of which the prototype vector is representative. For example data indicative of spread may specify a deviation, perhaps in terms of confidence intervals, defining a cluster of client queries.

Figure 2B:
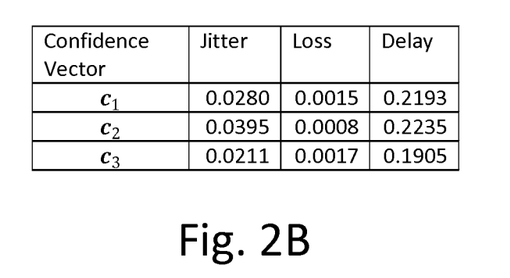

FIG. 2B illustrates a set of 99% confidence intervals for the prototype vectors of FIG. 2A. Such a query prototype vector and its associated confidence vector can be used to represent the QoS requirements specified by a cluster of requests.

Figure 2C:
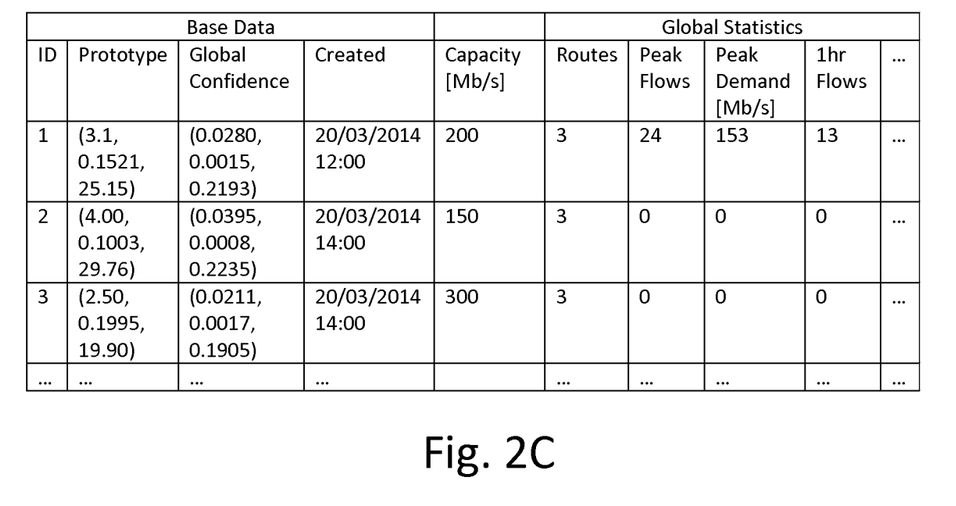
FIGS. 2C and 2D give examples of tables comprising QoS model information and model-to-route mapping information.

FIG. 2C illustrates an example of a data table which may be maintained by the system listing details of QoS models including the QoS prototype vector, confidence intervals, available data capacity for each model, along with various statistics for the models. Each metric corresponds to a given feature of a traffic flow or of a QoS model.

Figure 2D:
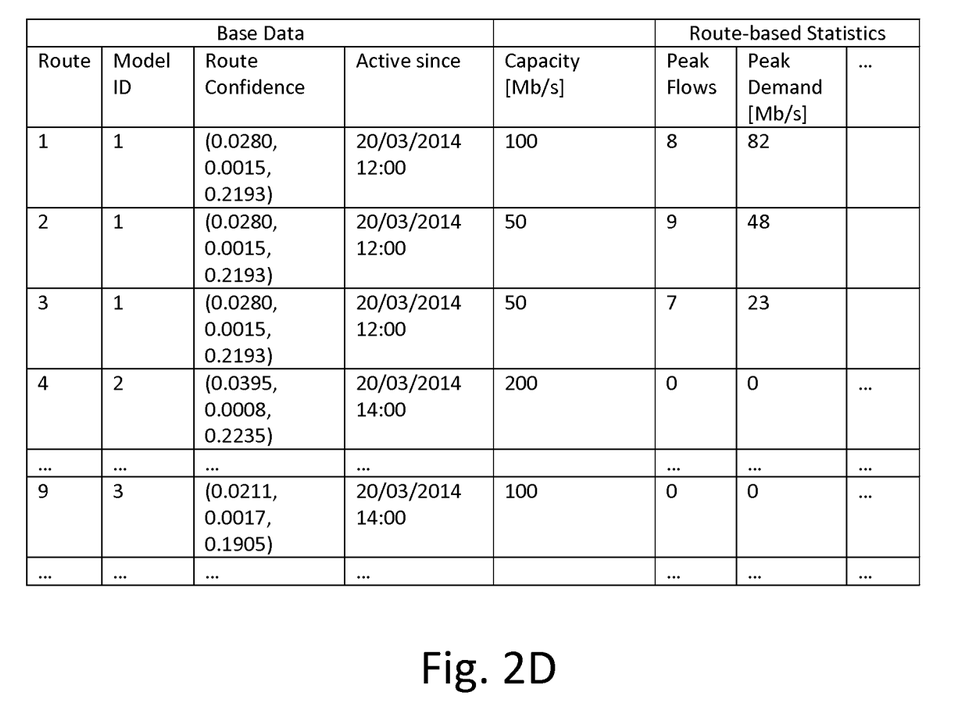

In addition to the model definitions themselves, the QoS Learning Module 116 and/or the Gatekeeper 104 may store a mapping that maps QoS models to routes. An example of a table providing such a mapping is illustrated in FIG. 2D. This mapping can be used to provide the "scoreboard" data advertised to clients at the Gatekeeper 104. QoS models may specify constraints on all features or on any subset of available features, leaving other features unspecified. The feature specification of a QoS model may be considered to constitute a form of Service Level Agreement (SLA), specifying the service level expected when transporting a data flow across the network. The features and associated metrics of a QoS model can relate to any measurable quantities associated with the network and how traffic is carried across the network. This includes both "hard" performance metrics, such as packet loss, packet jitter and packet delay, as well "soft" metrics such as:

energy consumption (e.g. an estimate of the energy consumed by carrying a packet or flow over a given route)
a cost value representing a financial cost involved in transport of a packet or flow across a route
resilience (e.g. an expected rate of failure along a route, for example due to hardware failures, routers crashing and the like)

Some metrics (especially "soft" metrics e.g. cost), may be represented as a set of value bands rather than as a continuum of values, which can enable derivation of more useful and representative QoS models.

Figure 3A:
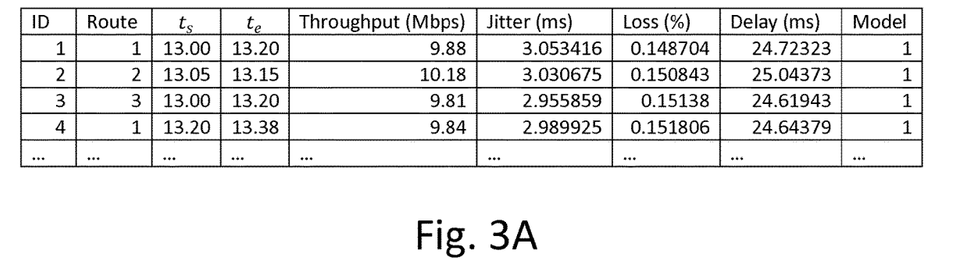
FIG. 3A gives an example of a table comprising items of route data.

FIG. 3A provides an example of a plurality of items of route data, such as may be maintained by the QoS Learning Module 116. Each item of route data is associated with a corresponding route through the network (e.g. a sequence of network nodes) and indicates a QoS component of the corresponding route. The example illustrated in FIG. 3 shows items of route data which indicate jitter, packet loss, and delay along the associated route. Other QoS components may also be specified by the route data. Although not shown the items of route data may also indicate a destination address and a source address of the associated route.

Figure 3B:
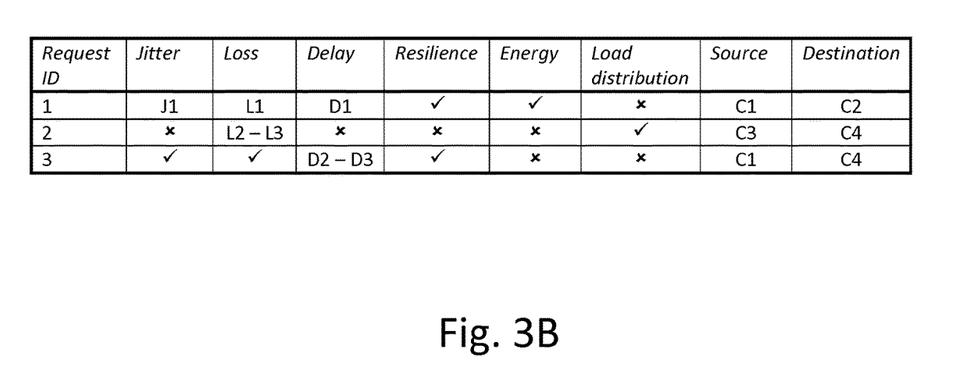
FIG. 3B gives an example of a table comprising client query data.

FIG. 3B comprises a table each row of which indicates QoS requirements specified by client query messages. It can be seen that a given feature can be requested at a specific value (e.g. J1, L1, D1), a band of values (e.g. between L2 and L2, or between D2 and D3) or alternatively as a yes/no feature (represented as a tick or a cross in FIG. 3B). The source and destination entities can be end clients and/or aggregation points. The requests can be held as individual entries in this table or collected into a single row with an indication of how many times the same request has been made in a selected time period. FIG. 3B shows data from query messages which specify QoS requirements such as jitter, packet loss, delay, resilience, energy, load distribution. Query messages may specify any one or more of these QoS features, or other QoS features. It can also be seen that the query messages may specify a source and destination address for the data flow which the client wishes to transmit through the network.

Figure 4:
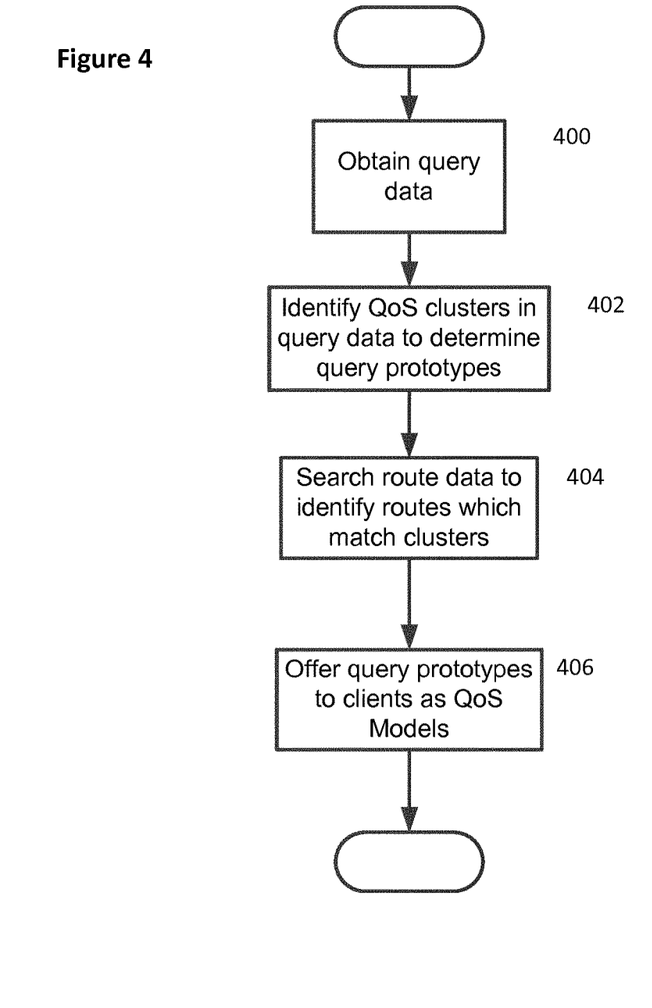
FIG. 4 illustrates a method for use in a network such as that illustrated in FIG. 1.

FIG. 4 illustrates a method which can be used to operate a network such as that illustrated in FIG. 1. As illustrated, the method comprises obtaining 400 query data. For example, the query data may be a plurality of queries received from clients, each specifying one or more QoS requirements for the transmission of a data flow in a network. The query data may also specify the source and destination addresses of these data flows. The query data is then used to identify 402 clusters of QoS requirements in order to determine a query prototype. Such a query prototype may comprise a vector of QoS component values calculated from these clusters. The query prototype is then compared 404 with route data to identify routes that provide QoS performance which matches the query prototype. First it is checked whether a sufficient number of routes match the query prototype. If this minimum support requirement is met a new QoS model can be established based on the query prototype. Establishing the new QoS model may comprise storing a mapping between the new QoS model and the routes through the network which provide the required QoS specified by the query prototype. The new QoS model can then be offered 406 to clients at the Gatekeeper. Accordingly, when a further query is received at the Gatekeeper, a query response can be transmitted to the client offering this new QoS model. The query response may comprise a CoS identifier associated with the new QoS model. This can enable packets marked with the CoS identifier to be routed along routes which match the client's requested QoS.

Figure 5:
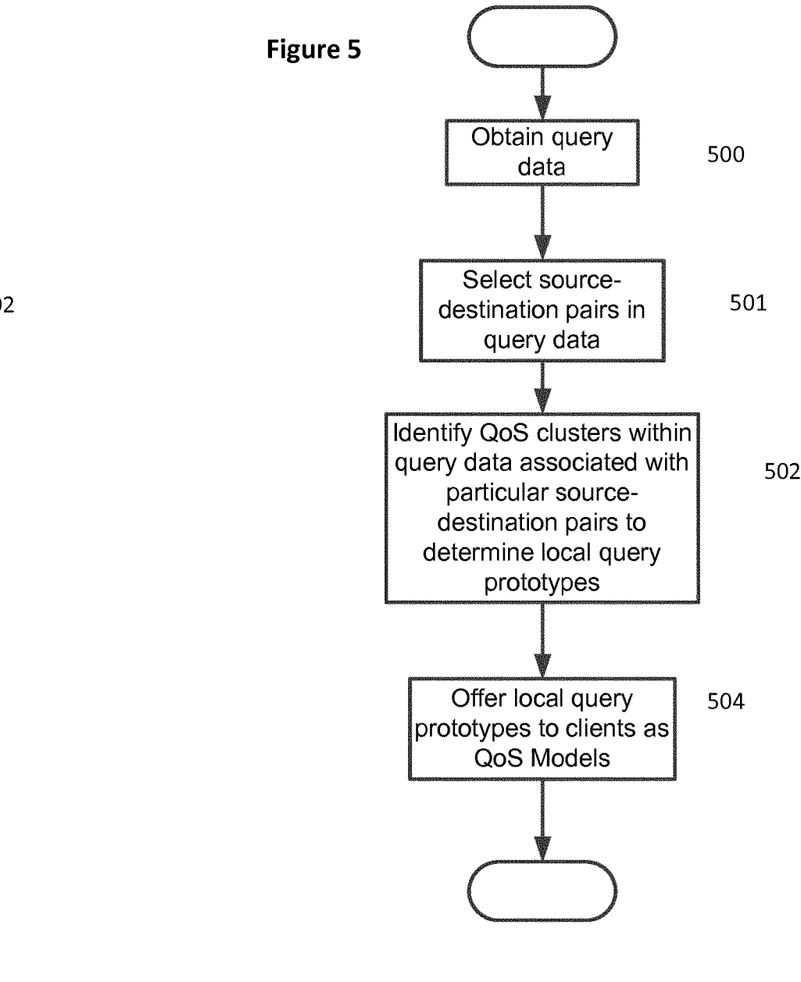
FIG. 5 illustrates another method for use in a network such as that illustrated in FIG. 1.

FIG. 5 illustrates another method in which a source address criterion and/or a destination address criterion is used to filter the client queries before clusters of QoS requirements are identified to provide a query prototype. This may enable demand driven QoS models to be offered in localised areas of a network. As illustrated in FIG. 5, the method begins with obtaining 500 query data. This query data may be based on a plurality of queries, each query specifying:

(i) one or more quality-of-service (QoS) requirements for the transmission of a data flow in a network,
(ii) a source address for the traffic flow, and
(iii) a destination address for the traffic flow.

The next step in the method is to select 501, from this query data, those queries which match a source address criterion and a destination address criterion. For example, the source address criterion may select queries which relate only to a particular source address, or a group of source addresses such as a particular subnet. Likewise, the destination address criterion may select queries which relate only to a particular destination address, or a group of destination addresses such as a particular subnet. It will be appreciated therefore that a combination of a source address criterion and a destination address criterion can be used to select only those queries which relate to a particular source-destination pair. As another example, a source-destination criterion may specify queries relating to a single source address and a particular group of destinations, such as a subnet (or vice versa, e.g. group of sources, single destination).

Having filtered the query data in this way, a query prototype can be determined 502 based on the queries which match the source and destination criteria. The query prototype may then be compared with route data to identify routes that provide QoS performance which matches the query prototype. First it is checked whether a sufficient number of routes match the query prototype. If this minimum support requirement is met a new QoS model can be established based on the query prototype. Establishing the new QoS model may comprise storing a mapping between the new QoS model and the routes through the network which provide the required QoS specified by the query prototype. The new QoS model can then be offered 504 to clients at the Gatekeeper. Accordingly, when a further query is received at the Gatekeeper, a query response can be transmitted to the client offering this new QoS model. The query response may comprise a CoS identifier associated with the new QoS model. This can enable packets marked with the CoS identifier to be routed along routes which match the client's requested QoS.

It will be appreciated in the context of the description of FIG. 5, that in the same way that we can build client-centric models as defined with reference to FIG. 4, we can also build local QoS models for a particular geographical region or a collection of routes in the network. In these embodiments, the QoS Learning Module 116 may discover models by clustering the traffic performance data globally and then checking if the discovered models apply to certain routes. If the traffic in the network is not homogenous and there are regions of significantly different types of traffic QoS Learning Module 116 may determine that none of the globally detected models fit the local types of traffic particularly well. In an embodiment the QoS Learning Module 116 can find this out by not only looking at the rejected client requests, but also by measuring the "distance" between those requests and the accepted QoS Models and/or the number of SLA breaches. These statistics can be grouped by source and/or destination this can reveal sources and/or destinations with a low fit to the available QoS models. Another way to define local models would be concentrations of desirable traffic along certain routes that the operator is aware of. By creating QoS models that fit desirable traffic particularly well, the network operator can try to attract more of this traffic in certain regions of the network. Local QoS models may be built exactly like global QoS models with the exception that only route data from a selected region of the network is used to determine the QoS models. In addition to local models generated from route data we can also generate local client-centric models from the client requests as described above by using only requests from a selected region. In an embodiment the QoS Learning Module 116 monitors all query messages and, at intervals, checks the query messages for matching source/destination pairs. In the event that it discovers that the traffic between a particular source and a particular destination shows more than a threshold rate of unmatched initial client queries over a selected interval, it can trigger a check for local QoS models based on route data and query data for that source and destination.

Figure 6:
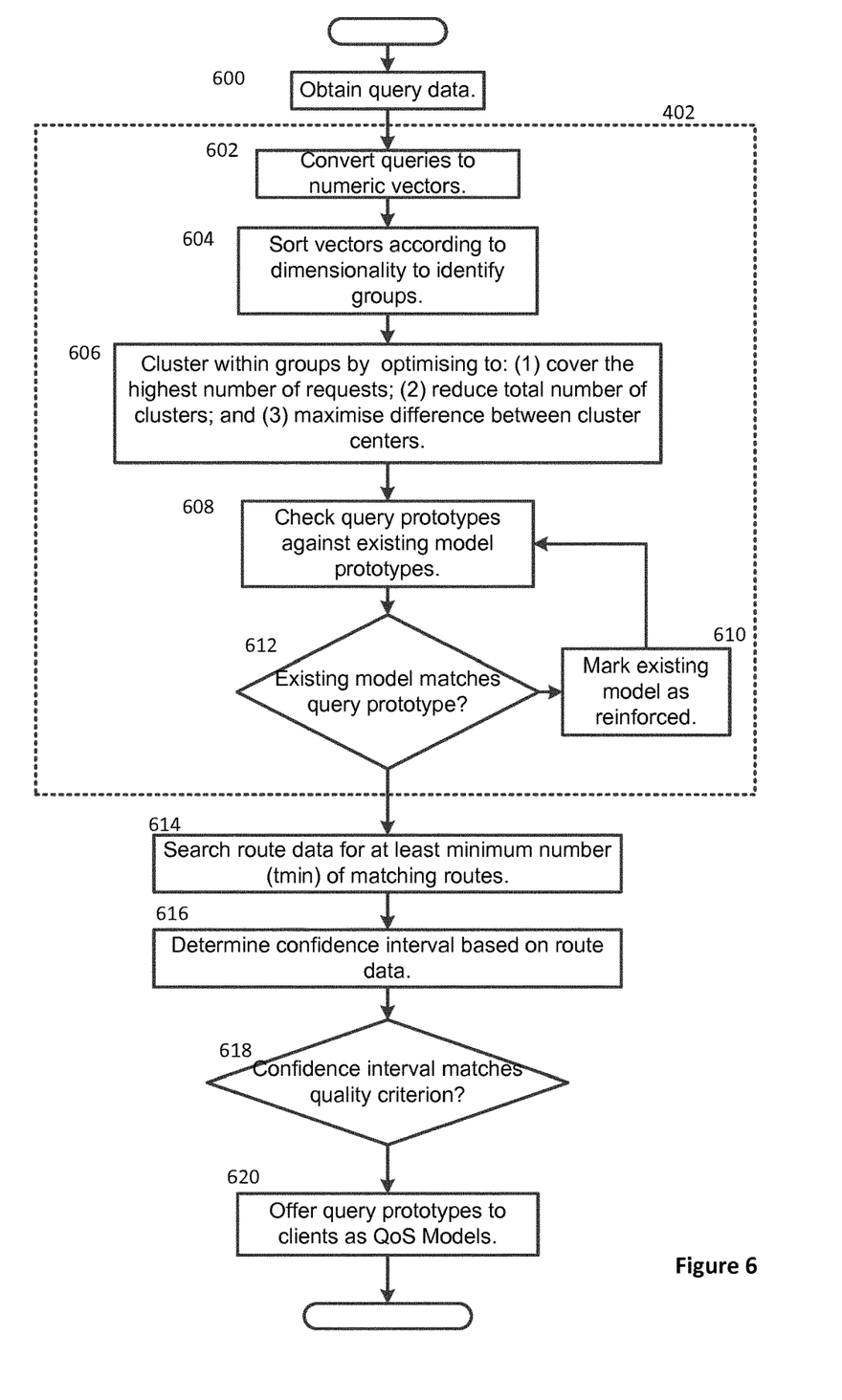
FIG. 6 illustrates an example of the method of FIG. 4.

FIG. 6 illustrates an example of a method according to that illustrated in FIG. 4. As illustrated in FIG. 6, client query messages are obtained 600, for example by being recorded by the Gatekeeper 104. It will be appreciated that, as explained above, the actual QoS model a client chooses at the end of the negotiation process may not be the same as that requested. In other words, a client might have asked for a different QoS performance to the one it eventually chooses. Reasons for this discrepancy may include unavailability of a QoS model that satisfies the specific request at the time (either due to overall unavailability or because the operator chooses not to present this option at the Gatekeeper. The client's query messages may be represented by query data such as that described above with reference to FIG. 3B.

Any non-numeric query data values, such as indications of a range of QoS, or an indication that best available performance is required may be converted 602 to numeric data. For a range of QoS values the range's midpoint may be used. For an indication of a feature being desirable (best available performance) any one of the following strategies may be used. As a first strategy one of the minimum, the average, or the maximum QoS value for this feature provided by routes in the network may be used. This QoS value may be determined from route data such as that illustrated in FIG. 3A (or from other data obtained by monitoring performance of routes in the network). This data may be based on monitoring during a time period close to the request (e.g. a time period which at least one of precedes or follows the request). As a second strategy, the request may be replaced with three vectors in one of which the QoS component specified by a range is replaced by the lower bound of the range, in another the average is used, and in the third the maximum is used. As a second strategy, the request may be replaced with one vector in which the QoS component specified by a range is replaced by one of the lower bound, the upper bound and the average. As a fourth strategy, the feature specified by the range can be removed from the requests so that a lower-dimensional version of the same vector can be used. Referring back to FIG. 3B, note that if a certain feature is marked as a 'yes' (i.e. a tick), it only means that the client would like the best possible option within this feature. A band such as L1-L2 specifies that the client would like to remain within this band of performance in the feature and a single value J1 is the most specific form of requesting a performance level within this feature. There might be associated with this value a tolerance of acceptable values, as a 'cloud' around the value itself. The clustering algorithm can treat these types of requests with as much granularity as it sees fit. For example, all requests for maximum delay can be fit into a single QoS model for the best delay performance possible, then only one cluster centre is searched for with all routes clustered around it in some way according to the delay they currently (or are forecasted to) exhibit. The routes can then be sorted, for example in ascending order. Alternatively, bands of requested performance within a feature can be condensed into the average requested value and subsequently clustered around single points.

The numeric query vectors may then be grouped 604 according to their components. For example, those client queries which specify values for the same QoS components may be treated as a group. A series of such groups may be identified, and each group treated separately. Within each group, the queries are then clustered 606 to determine a query prototype. In other words, the requests are sorted into groups according to their dimensionality, and a separate cluster analysis applied to each group. Each group may have a different number of features, and this may provide request prototypes of different dimensionalities.

By clustering 606 each group, at least one cluster can be selected which comprises a cluster centre value for each specified QoS component (e.g. a centroid, such as a measure of central tendency for that component). These clusters can be selected from amongst the query data using any clustering algorithm, such as k-means. Generally such a clustering algorithm may use a numerical search of a merit function. The merit function may be selected so that the optimisation: (a) reduces a sum of differences between the clusters and the QoS components specified by the query data; (b) reduces the total number of clusters; and (c) increases the difference between the selected clusters. The differences (whether between clusters or between clusters and QoS components) may comprise Euclidean distances. Any one or more of these three considerations may be taken into account by the merit function. The purpose of this optimisation is to determine the optimum cluster centres that cover most of the query data. The more granular the cluster centres are, the fewer client requests will be covered by the centre itself and more cluster centres will be required to cover a desirably large proportion of client requests. Also, the more specific the cluster centre is made, the fewer client requests are clustered around it and the smaller the cluster support must be for a cluster centre to qualify as a QoS model to search for in the network. The optimisation may thus be configured to simplify the request data into as few cluster centres as possible.

Query prototypes can thus be identified based on the clusters of QoS components in the query data which, according to the optimisation, best represent that query data. These query prototypes can then be checked 608 against existing QoS models at the Gatekeeper. In the event that one of the query prototypes matches one of the existing QoS models (e.g. the query prototype falls within a confidence interval specified by an existing QoS model) then that existing model may be marked 610 as being reinforced. This may comprise the QoS Learning Module 116 storing data indicating that the model should be maintained in the event that it would otherwise be removed as mentioned above with reference to the general operation of the apparatus of FIG. 1. This enables query prototypes which are already reflected in the existing QoS models to be removed from further consideration (i.e. no new model is offered because an existing model already provides QoS according to that query prototype). Where QoS models are reviewed and deleted at intervals, then reinforcement may avoid withdrawal of models which are desired by clients. If no existing QoS model matches the query prototype, the QoS Learning Module 116 searches 614 the route data to identify routes which match the query prototype. It can then determine 620 whether to offer the new QoS model to clients at the Gatekeeper 104 based on this comparison (i.e. steps 614, 616, and 618 are optional). For example, the new QoS model may only be offered if a minimum number of routes match the query prototype.

The QoS Learning Module 116 may also use the matching route data to determine 616 a confidence interval of one or more of the QoS components specified in the query prototype. The confidence interval may comprise a measure of the spread (such as the variance or other measure of deviation) of the QoS components across the matching routes. This confidence interval may be determined based on the QoS components of the items of route data which match the query prototype—e.g. a confidence interval may be determined from the route data for one or more of the QoS components specified by the query prototype. The QoS Learning Module 116 may then determine 618 whether to offer the new QoS model at the Gatekeeper 104 based on this route based confidence interval. For example, if the confidence interval of a particular QoS component across the collection of routes does not meet a quality criterion for that QoS component, the relevant query prototype may not be offered as a new QoS model. If however this requirement is met a new QoS model can be established based on the query prototype. Establishing the new QoS model may comprise storing a mapping between the new QoS model and the routes through the network which provide the required QoS specified by the query prototype. The new QoS model can then be offered to clients at the Gatekeeper. Accordingly, when a further query is received at the Gatekeeper, a query response can be transmitted to the client offering this new QoS model. The query response may comprise a CoS identifier associated with the new QoS model. This can enable packets marked with the CoS identifier to be routed along routes which match the client's requested QoS.

As mentioned above, in some circumstances a query prototype may be identified which matches an existing QoS Model. In an embodiment, such an existing QoS model may be marked as being reinforced. This means that, if the QoS Learning Module 116 runs a clustering algorithm or other method to identify QoS models and a prototype which matches the reinforced QoS model is not rediscovered, that reinforced QoS model will not be automatically removed from the model database. Such a reinforced model prototype will thus be evaluated against the traffic database for an extended period of time and can be kept even if the model confidence is low. This can enable the network operator to decide to treat discovered prototypes, request prototypes and reinforced prototypes differently in terms of their survival in the model database.

Figure 7:
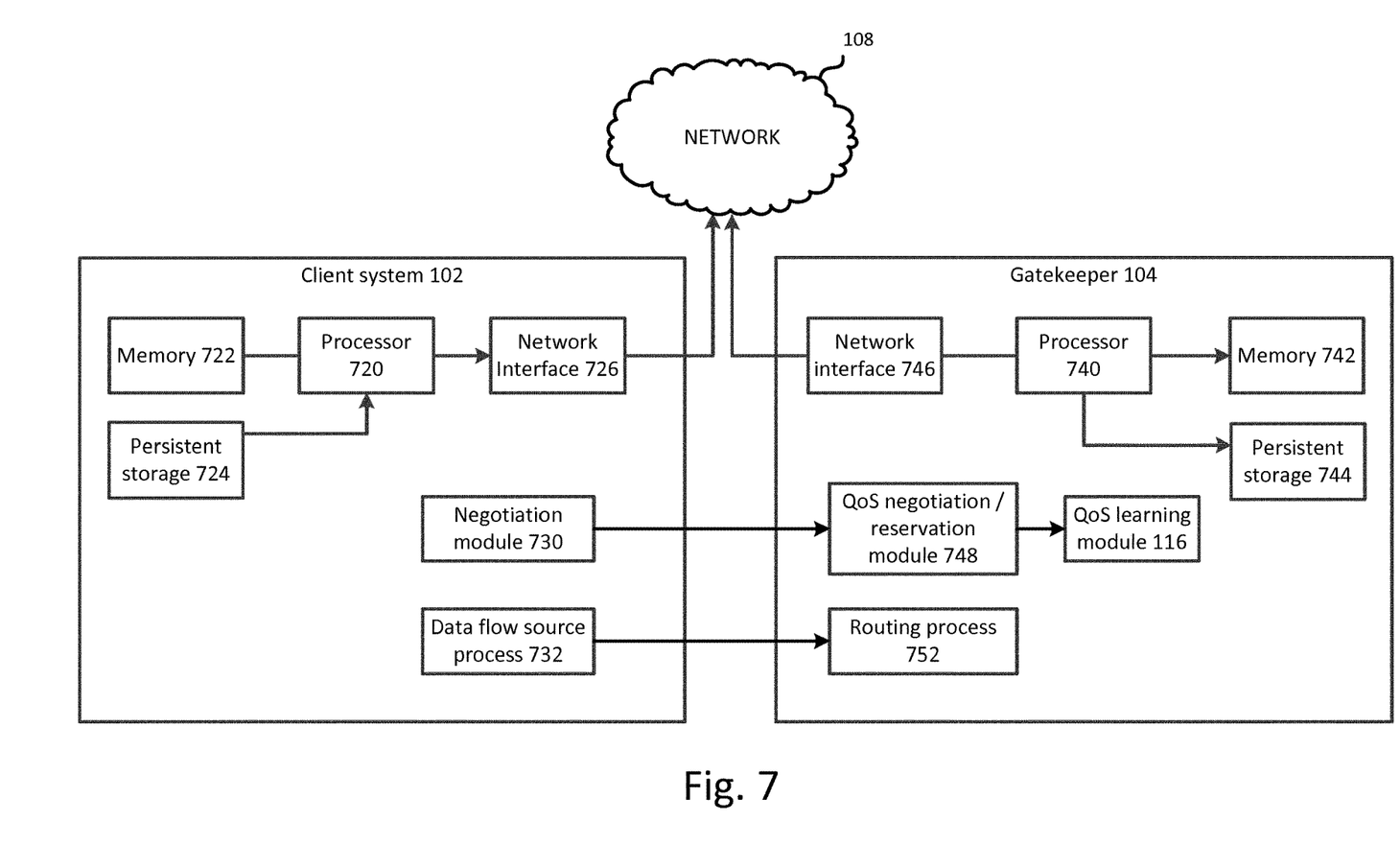
FIG. 7 a possible hardware/software/firmware architecture of the client and Gatekeeper components of the network of FIG. 1.

FIG. 7 illustrates by way of example a possible hardware/software/firmware architecture of the client 102 and Gatekeeper 104 components of the system.

The client system 102 (e.g. a server originating a data flow that is to be transmitted across the network) includes one or more processors 720 together with volatile/random access memory 722 for storing temporary data and software code being executed. A network interface 726 is provided for communication with other system components (including Gatekeeper 104 104) over one or more networks 108 (e.g. Local or Wide Area Networks, including the Internet).

Persistent storage 724 (e.g. in the form of hard disk storage, optical storage, solid state storage and the like) persistently stores software for implementing the methods described previously, including a negotiation module 730 for participating in the QoS negotiation process and a data flow source process 732 for generating and/or forwarding the data flow that is to be subject to the negotiated QoS. The persistent storage also includes other typical server software and data (not shown), such as a server operating system.

The client system 102 may include other conventional hardware components as known to those skilled in the art (e.g. I/O devices), and the components are interconnected by a data bus (this may in practice consist of several distinct buses such as a memory bus and I/O bus).

The Gatekeeper 104 may comprise conventional server hardware, including memory 742 and persistent storage media 744 (e.g. magnetic/optical/solid state disk storage), both for storing computer-executable software code and data, one or more processors 740 for executing software and a network interface 746 for communication with external networks 108.

The processor runs software modules including the QoS Learning Module 116 which implements the learning algorithms for dynamically discovering QoS models based on monitored data flow statistics, and creates a database of QoS models and model-to-route mappings for storage e.g. in memory 742 and/or persistent storage 744.

The processor 740 further runs a QoS negotiation/reservation module 748 for implementing the Gatekeeper's negotiation and reservation functions, based on the QoS model information and route information stored in persistent storage 744 and/or memory 742. The negotiation module 748 communicates with the corresponding module 730 at client system 102 via the network to implement the described negotiation protocol.

In the case that the Gatekeeper 104 additionally performs traffic forwarding, the Gatekeeper 104 may also run routing process 752 for routing traffic tagged with a given negotiated QoS that is received from the client system 102 (in particular data flow source process 732) onto assigned routes and performing load balancing and the like. Alternatively, traffic routing based on the negotiated QoS could be performed at external routing devices (e.g. the edge routers of FIG. 1).

The persistent storage also includes other typical server software and data (not shown), such as a server operating system. The Gatekeeper 104 may include other conventional hardware components, with components interconnected via a bus, as described for client system 102. Note that where the Gatekeeper 104 implements routing functions, other conventional router software and hardware may be included, such as a set of interconnected line interface cards and a router operating system.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

There are different types of cluster analysis that can be used to learn query prototypes. One possibility is to use a centroid-based clustering method like k-means clustering or variations thereof like fuzzy c-means clustering (see for example Frank Höppner, Frank Klawonn, Rudolf Kruse, and Thomas Runkler. *Fuzzy Clustering*. Wiley, 1999). Centroid based clustering algorithms need to solve the problems of assigning initial prototypes or cluster centres and determining the optimal number of cluster centres. Initial prototypes may be picked at random from the set of query data. The optimal number of clusters can be determined by repeatedly clustering the query data with increasing number of clusters until the result no longer improves. The quality of a clustering result can be determined by relating the intra- to the inter-cluster distances. Centroid-based clustering is however only one possible way of obtaining query prototypes representing naturally occurring groups in client query messages requesting QoS for data transmissions. It will be appreciated in the context of the present disclosure that query prototypes can also be learned by other types of clustering algorithms like distribution-based or density-based approaches or by methods known from artificial neural networks like self-organising maps (see for example Rosaria Silipo. Neural Networks. In: Michael Berthold and David J. Hand (eds). Intelligent Data Analysis. Springer, Berlin, 1999, pp 217-268.) In addition to identifying prototypes learned from client query messages, the Gatekeeper 104 may also be configured to offer predetermined QoS models—these may comprise default QoS models that a network operator wishes to offer. For these prototypes, the QoS Learning Module 116 may need only to compute confidence vectors—the prototypes themselves need not be changed through cluster analysis. It will therefore be appreciated that QoS models and associated routes may be identified using a demand driven approach (e.g. from client queries), or they may be predetermined, or they may comprise a mixture of predetermined and demand driven models.

The selection of models according to the criteria and metrics described herein may be performed by the QoS Learning Module 116 as described above, or by the Gatekeeper itself, or by a separate logical entity (which may comprise logic, and which may be embodied in software, firmware or a combination thereof). The selection may be performed at intervals, for example periodically. Human intervention may not be required in this process.

In some examples, one or more memory elements can store data and/or program instructions used to implement the operations described herein. Embodiments of the disclosure provide tangible, non-transitory storage media comprising program instructions operable to program a processor to perform any one or more of the methods described herein and/or to provide data processing apparatus as described herein.

The activities and apparatus outlined herein, such as the QoS Learning Module 116 and the Gatekeeper 104 may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software code, electronic instructions, flash memory, optical disks, CD-ROMs, DVD ROMs, magnetic or optical cards, other types of machine-readable mediums suitable for storing electronic instructions, or any suitable combination thereof.

The functionality of the QoS Learning Module 116 and the Gatekeeper 104 may be provided in a single integrated unit, or it may be distributed between a number of processors, which may be arranged to communicate over a network. This may enable, for example, the processing steps of the methods described herein to be performed by devices which are distributed throughout a network—for example parts of one or more nodes of the network may cooperate to provide this functionality.

In the context of the present disclosure other examples and variations of the devices and methods described herein will be apparent to a person of skill in the art. Other examples and variations are within the scope of the disclosure, as set out in the appended claims.

The invention claimed is:

1. A method comprising:
   receiving a plurality of queries to obtain query data, each query specifying one or more quality-of-service (QoS) requirements for the transmission of a data flow in a network;
   determining a query prototype by selecting queries from the plurality of queries that specify values for the same QoS requirements and identifying clusters of the same QoS requirements in the query data, the query prototype comprising at least one QoS component value calculated based on the identified clusters of the same QoS requirements;

obtaining a plurality of items of route data, wherein each item of route data is associated with a corresponding route through the network and indicates a QoS component of the corresponding route;

comparing the route data with the query prototype to identify routes which match the query prototype; and in an event that a sufficient number of routes match the query prototype to provide a minimum support requirement, responding to a further query by transmitting a query response comprising a new QoS model based on the matching query prototype.

2. The method of claim 1 wherein the query response comprises a CoS identifier associated with the QoS model, the method comprising routing packets marked with the CoS identifier along the routes which match the query prototype.

3. The method of claim 1 wherein the plurality of queries comprise a source address for the traffic flow, and a destination address for the traffic flow, and determining the query prototype comprises selecting, from the plurality of queries, queries which match at least one of a source address criterion and a destination address criterion, and clustering the selected queries to determine the query prototype.

4. The method of claim 3 wherein the source address criterion comprises the source address of the traffic flow matching a source subnet mask.

5. The method of claim 3 wherein the destination address criterion comprises the destination address of the traffic flow matching a destination subnet mask.

6. The method of claim 1 wherein clustering the selected queries comprises selecting at least one cluster, wherein each cluster comprises a cluster centre for each specified QoS requirement.

7. The method of claim 1 wherein the clusters are selected to (a) reduce a sum of differences between the clusters and the plurality of queries; (b) reduce the total number of clusters; and (c) increase the difference between the selected clusters.

8. The method of claim 1 comprising determining, based on comparing the query prototype with at least one pre-existing QoS model, whether to offer the new QoS model.

9. The method of claim 1 comprising determining whether to offer the new QoS model based on a confidence interval determined from the items of route data which match the query prototype.

10. A method comprising:
receiving a plurality of queries, each query specifying:
(iv) one or more quality-of-service (QoS) requirements for the transmission of a data flow in a network,
(v) a source address for the traffic flow, and
(vi) a destination address for the traffic flow;
selecting, from the plurality of queries, queries which match a source address criterion and a destination address criterion;
determining a query prototype by selecting queries from the plurality of queries that specify values for the same QoS requirements and identifying clusters of the same QoS requirements in the query data, the query prototype comprising at least one QoS component value calculated based on the identified clusters of the same QoS requirements of the selected queries; and, responding to a further query by transmitting a query response comprising a new QoS model based on the query prototype.

11. The method of claim 10 comprising comparing route data with the query prototype to identify routes which match the query prototype, and determining whether to offer the new QoS model based on the comparing.

12. The method of claim 11 comprising offering the new QoS model when at least a minimum number of routes match the query prototype.

13. A non-transitory computer program product comprising program instructions configured to program a processor of a network device to perform the method of claim 1.

14. A data processing apparatus, comprising one or more processors and storage memory storing software code for execution by the one or more processors such that the data processing apparatus is configured to receive a plurality of queries to obtain query data, each query specifying one or more quality-of-service (QoS) requirements for the transmission of a data flow in a network;

determine a query prototype by selecting queries from the plurality of queries that specify values for the same QoS requirements and identifying clusters of the same QoS requirements in the query data, the query prototype comprising at least one QoS component value calculated based on the identified clusters of the same QoS requirements;

obtain a plurality of items of route data, wherein each item of route data is associated with a corresponding route through the network and indicates a QoS component of the corresponding route;

compare the mute data with the query prototype to identify mutes which match the query prototype; and in an event that a sufficient number of routes match the query prototype to provide a minimum support requirement, respond to a further query by transmitting a query response comprising a new QoS model based on the matching query prototype.

15. A method comprising:
receiving a plurality of queries, each query specifying one or more quality-of-service (QoS) requirements for the transmission of a data flow in a network;
determining a query prototype, the query prototype comprising at least one QoS component value based on the one or more QoS requirements;
obtaining a plurality of items of route data, wherein each item of route data is associated with a corresponding route through the network and indicates a QoS component of the corresponding route;
comparing the route data with the query prototype to identify routes which match the query prototype;
in an event that a selected number of routes match the query prototype, responding to a further query by transmitting a query response comprising a new QoS model based on the matching query prototype; and
determining whether to offer the new QoS model based on a confidence interval determined from the items of route data which match the query prototype.

16. A data processing apparatus, comprising one or more processors and storage memory storing software code for execution by the one or more processors such that the data processing apparatus is configured to:
receive a plurality of queries, each query specifying one or more quality-of-service (QoS) requirements for the transmission of a data flow in a network;

determine a query prototype, the query prototype comprising at least one QoS component value based on the one or more QoS requirements;

obtain a plurality of items of route data, wherein each item of route data is associated with a corresponding route through the network and indicates a QoS component of the corresponding route;

compare the route data with the query prototype to identify routes which match the query prototype;

in an event that a selected number of routes match the query prototype, respond to a further query by transmitting a query response comprising a new QoS model based on the matching query prototype; and determine whether to offer the new QoS model based on a confidence interval determined from the items of route data which match the query prototype.

* * * * *